United States Patent
Zhu

(10) Patent No.: US 11,702,087 B2
(45) Date of Patent: Jul. 18, 2023

(54) AUTONOMOUS DRIVING MONITORING SYSTEM

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 511 days.

(21) Appl. No.: 16/573,365

(22) Filed: Sep. 17, 2019

(65) Prior Publication Data

US 2021/0078588 A1    Mar. 18, 2021

(51) Int. Cl.
*B60W 50/02* (2012.01)
*G07C 5/08* (2006.01)
*G07C 5/00* (2006.01)
*G05D 1/00* (2006.01)

(52) U.S. Cl.
CPC ....... *B60W 50/0205* (2013.01); *G05D 1/0088* (2013.01); *G07C 5/008* (2013.01); *G07C 5/0808* (2013.01); *B60W 2050/021* (2013.01); *B60W 2510/18* (2013.01); *B60W 2510/20* (2013.01); *B60W 2556/45* (2020.02); *G05D 2201/0213* (2013.01)

(58) Field of Classification Search
CPC .. B60W 50/00; B60W 50/02; B60W 50/0205; B60W 2050/021; B60W 50/0225; B60W 2050/0295; B60W 2050/0297; B60W 50/04; B60W 50/045; B60W 2050/046; B60W 50/085; B60W 30/095; B60W 30/0953; B60W 30/0956; G07C 5/00; G07C 5/08; G07C 5/0808; G07C 5/0816; G07C 5/0825; G07C 5/0833; G07C 5/0841; G07C 5/085; G07C 5/0858; G07C 5/0866; G07C 5/0875; G07C 5/0883; G07C 5/0891; G07C 5/10; G07C 5/12

See application file for complete search history.

(56) References Cited

U.S. PATENT DOCUMENTS

| | | | |
|---|---|---|---|
| 2013/0197795 A1* | 8/2013 | Basnayake | G01C 21/30 701/412 |
| 2019/0283768 A1* | 9/2019 | Das | B60W 30/16 |
| 2020/0026246 A1* | 1/2020 | Nakagawa | G05B 9/03 |
| 2020/0363816 A1* | 11/2020 | Zuo | G05D 1/0217 |
| 2020/0371534 A1* | 11/2020 | Ji | G08G 1/22 |
| 2021/0271212 A1* | 9/2021 | Wojsznis | G05B 13/041 |

OTHER PUBLICATIONS

Salem, "A Comparison Between MPC and Optimal PID Controllers: Case Studies" Michael Faraday IET International Summit: MFIIS-2015, Sep. 12-13, 2015, Kolkata, India (Year: 2015).*

(Continued)

*Primary Examiner* — Christian Chace
*Assistant Examiner* — Jordan S Fei
(74) *Attorney, Agent, or Firm* — Womble Bond Dickinson (US) LLP

(57) ABSTRACT

In one embodiment, a control command is generated by an autonomous controller of the ADV. Feedback is sensed that corresponds to the control command. A difference is determined between a) the control command, and b) the feedback corresponding to the control command. If the difference is meets a threshold, then a fault response is generated.

20 Claims, 9 Drawing Sheets

(56) References Cited

OTHER PUBLICATIONS

Mapoka, "Performance Comparison of Two Controllers on a Nonlinear System" International Journal of Chaos, Control, Modelling and Simulation (IJCCMS) vol. 2, No. 3, Sep. 2013 (Year: 2013).*
Thomsen "PI Control, PI-Based State Space Control, and Model-Based Predictive Control for Drive Systems With Elastically Coupled Loads—A Comparative Study" IEEE Transactions on Industrial Electronics, vol. 58, No. 8, Aug. 2011 (Year: 2011).*

* cited by examiner

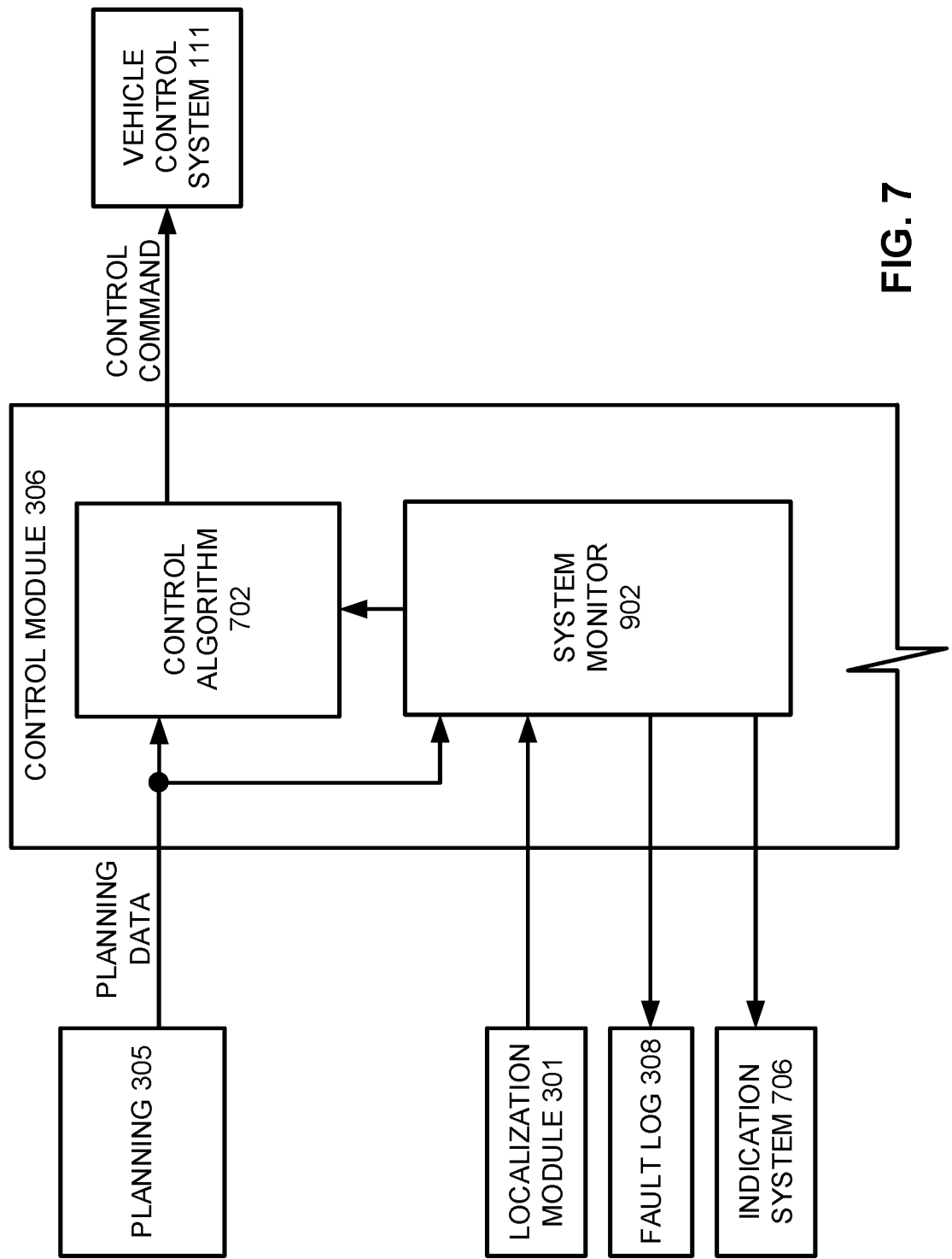

us 11,702,087 B2

AUTONOMOUS DRIVING MONITORING SYSTEM

TECHNICAL FIELD

Embodiments of the present disclosure relate generally to operating autonomous vehicles. More particularly, embodiments of the disclosure relate to an autonomous driving vehicle (ADV) monitoring system.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Safety is critical in autonomous driving vehicles, especially for Level 4 and Level 5 ADVs. A level 4 ADV is known as "fully autonomous" and are designed to perform all safety-critical driving functions and monitor roadway conditions for an entire trip. This is limited, however, to the operational design domain (ODD) of the vehicle. In other words, the safety-critical driving functions and monitor does not cover every driving scenario. Level 5 describes an ADV having performance equal to that of a human driver, in every driving scenario, including extreme environments like dirt roads that are unlikely to be navigated by driverless vehicles in the near future.

BRIEF DESCRIPTION OF THE DRAWINGS

Embodiments of the disclosure are illustrated by way of example and not limitation in the figures of the accompanying drawings in which like references indicate similar elements.

FIG. 7 shows a system and process for monitoring localization of an ADV, according to one embodiment.

DETAILED DESCRIPTION

Figure 1:
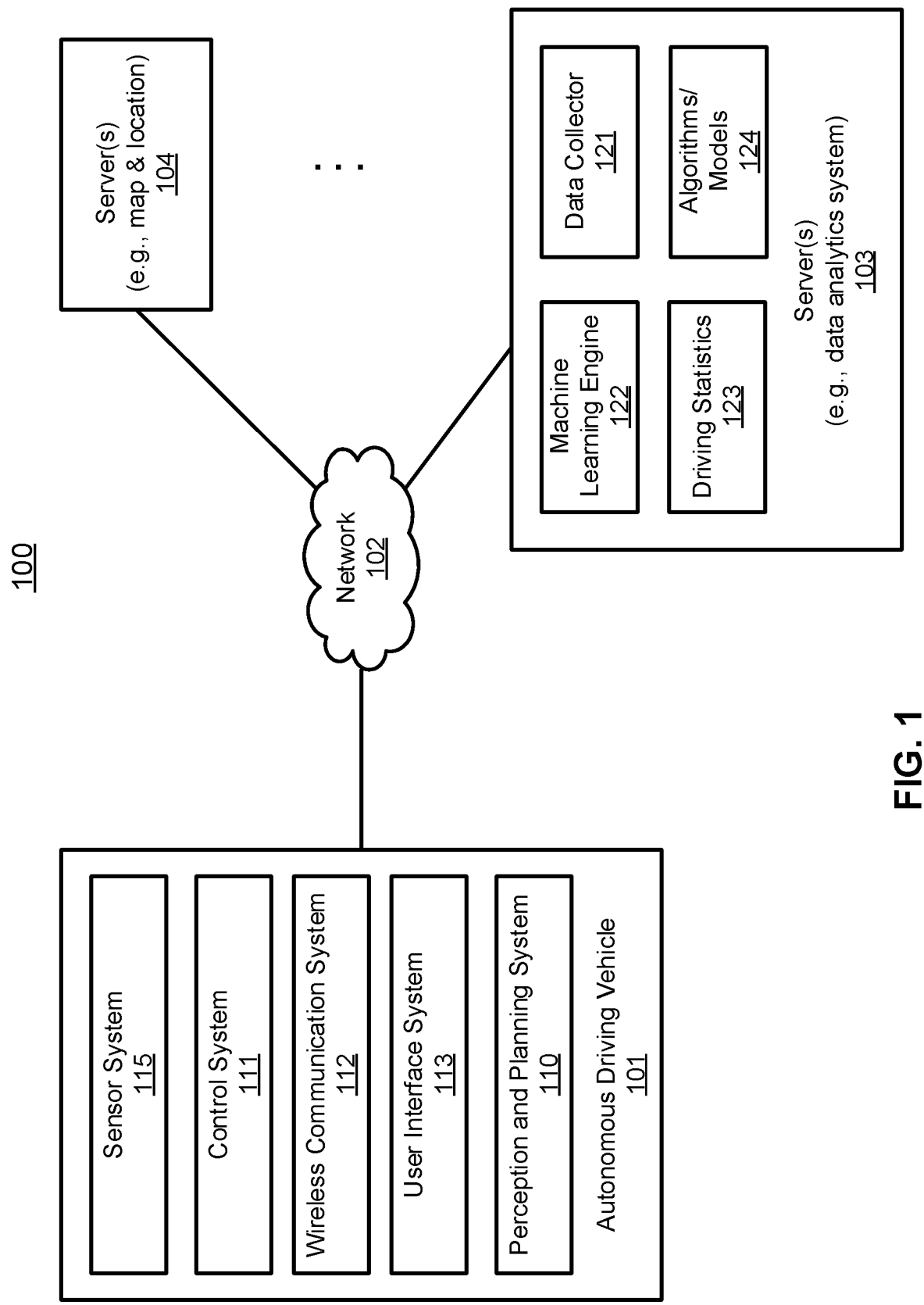
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method for monitoring an ADV system is described. The method can include generating a control command used to control an ADV. The control command can be, for example, throttle, steering, acceleration, braking, horn, turn signal, lights, high beam, window control, etc. Feedback is sensed by the ADV that corresponds to the control command. A difference is determined between a) the control command, and b) the feedback corresponding to the control command. If the difference satisfies a threshold, then the method includes generating a fault response, which can include providing a visual indication of a fault, controlling the ADV with a remedial control command, and/or storing the fault in memory.

According to some embodiments, a method for monitoring an ADV using a backup PID is described. The method can include determining a control difference between a) a control command (e.g., a throttle, steering, acceleration, or braking) being generated by a first control algorithm, and b) a second control command (e.g., throttle, steering, acceleration, or braking) generated by a second control algorithm that includes a proportional integral derivative (PID). The first control algorithm is different from the second control algorithm, using a different control algorithm (e.g., not a PID, or not only a PID). If the control difference satisfies a control threshold, then the ADV can be controlled with the second control command generated by the PID, and/or generating a fault response.

According to some embodiments, a method for monitoring localization of the ADV is described. If the ADV is not currently replanning a route of the ADV, the ADV can determine a difference between a) an expected location of the ADV, and b) a determined location of the ADV. The expected location of the ADV can be based on the previously determined location of the ADV (generated by a localization module) and planning data (e.g., a route, vehicle heading, and speed). The determined location of the ADV can be calculated by the localization module of the ADV at the ADV's current driving cycle. This is described further in other section. If the location difference satisfies a location threshold, then a fault response can be generated.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
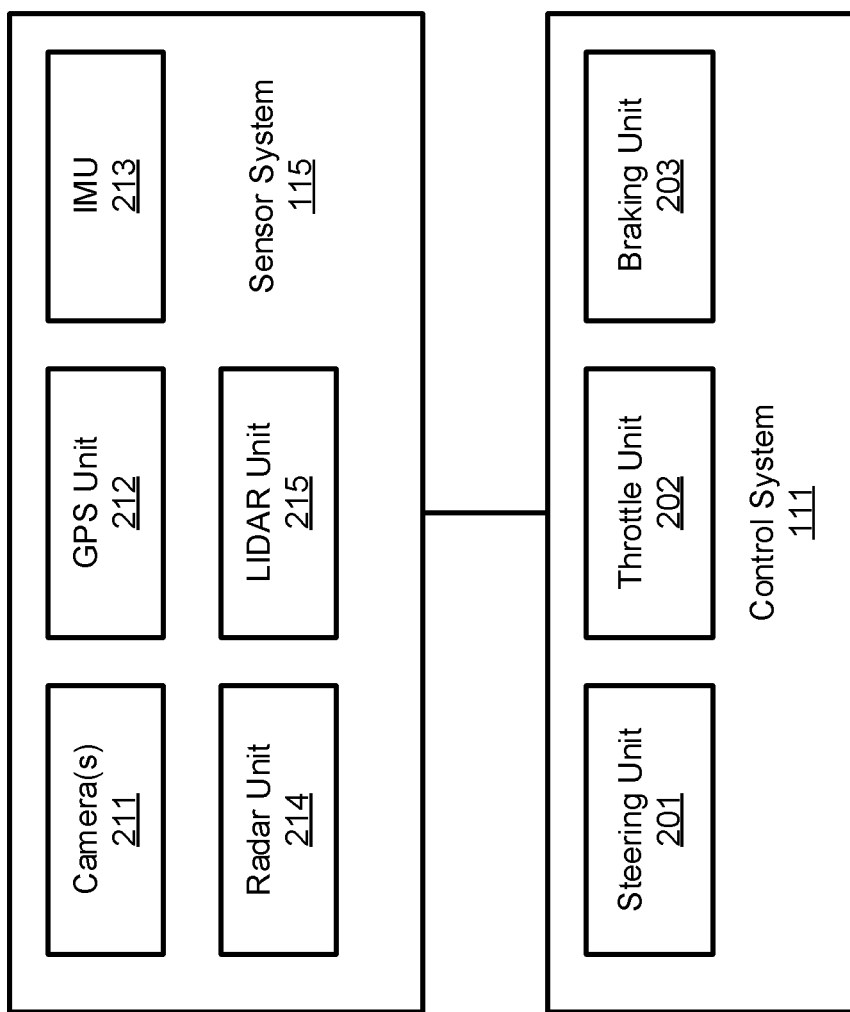
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Based on driving statistics 123, machine learning engine 122 generates or trains a set of rules, algorithms, and/or predictive models 124 for a variety of purposes, including algorithms for monitoring and determining whether the vehicle responds properly in response to control commands. Algorithms 124 can then be uploaded on ADVs to be utilized during autonomous driving in real-time.

Figure 3A:
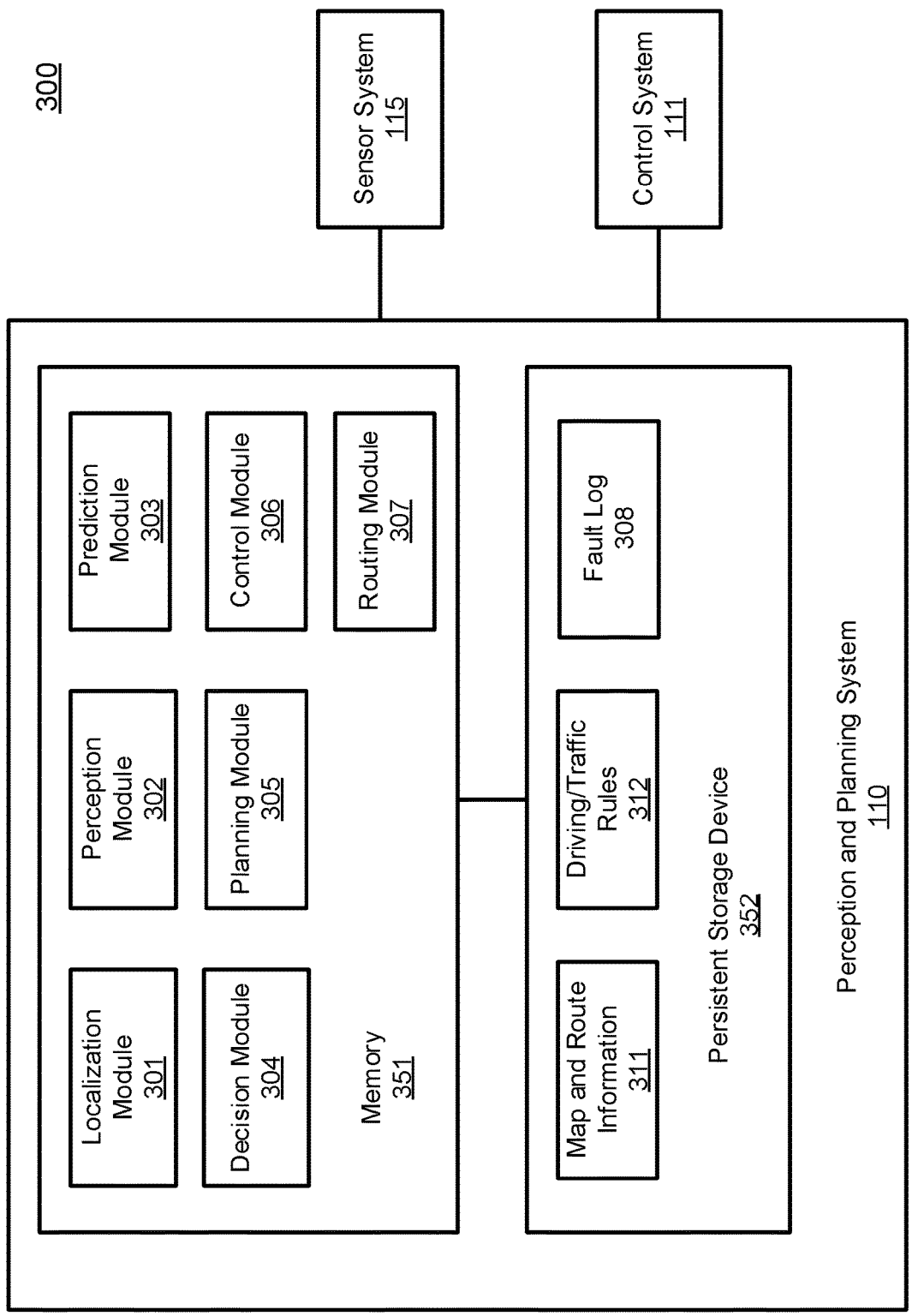
FIGS. 3A-3B are block diagrams illustrating an example of a perception and planning system used with an autonomous vehicle according to one embodiment.
Figure 3B:
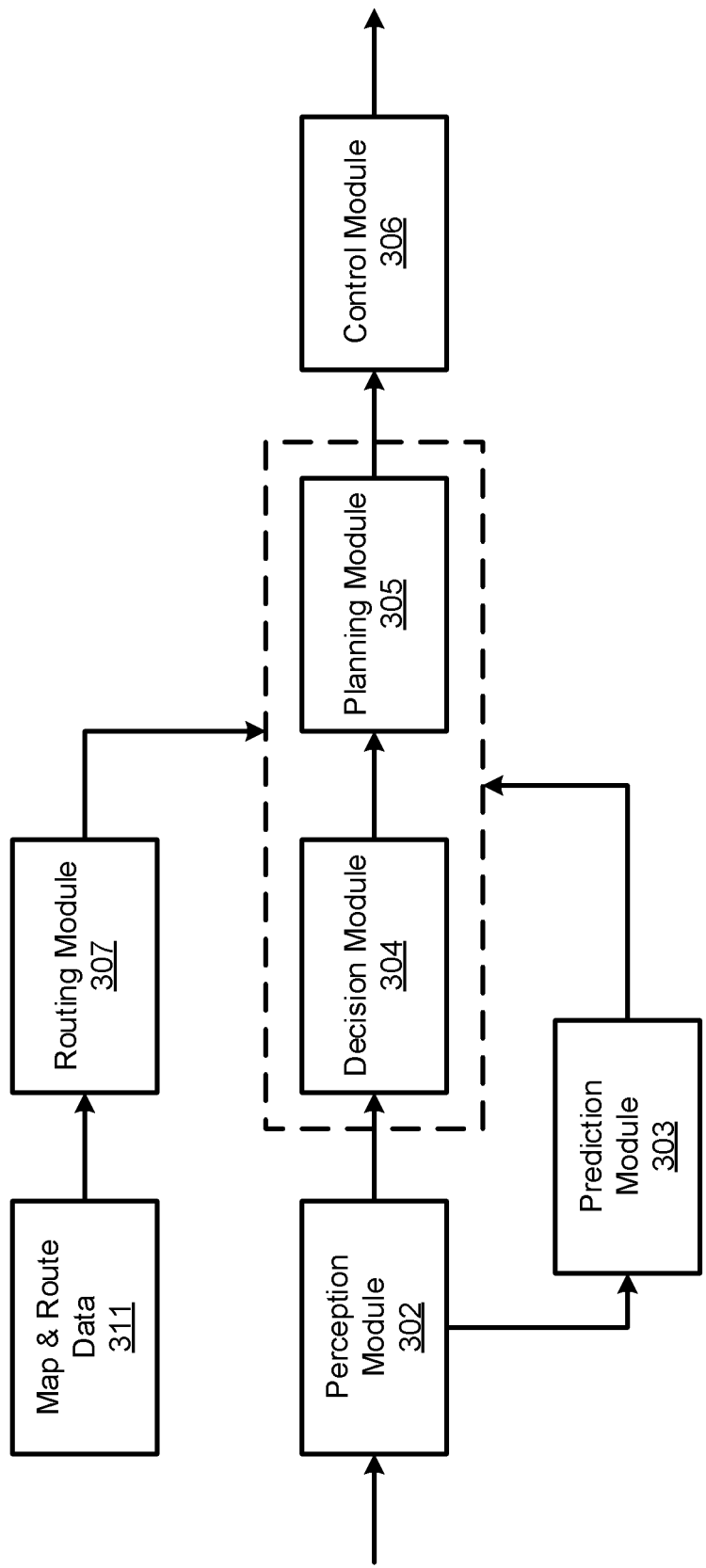

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and fault log 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/ path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

A fault log 308 can be managed in persistent storage device 352. The fault log can be populated when a system monitor detects possible problems. Fault log 308 may contain data collected by a data collection module (not shown) that is configured to collect the operation data from various components via various sensors. This is described further in other sections of the disclosure.

Figure 4:
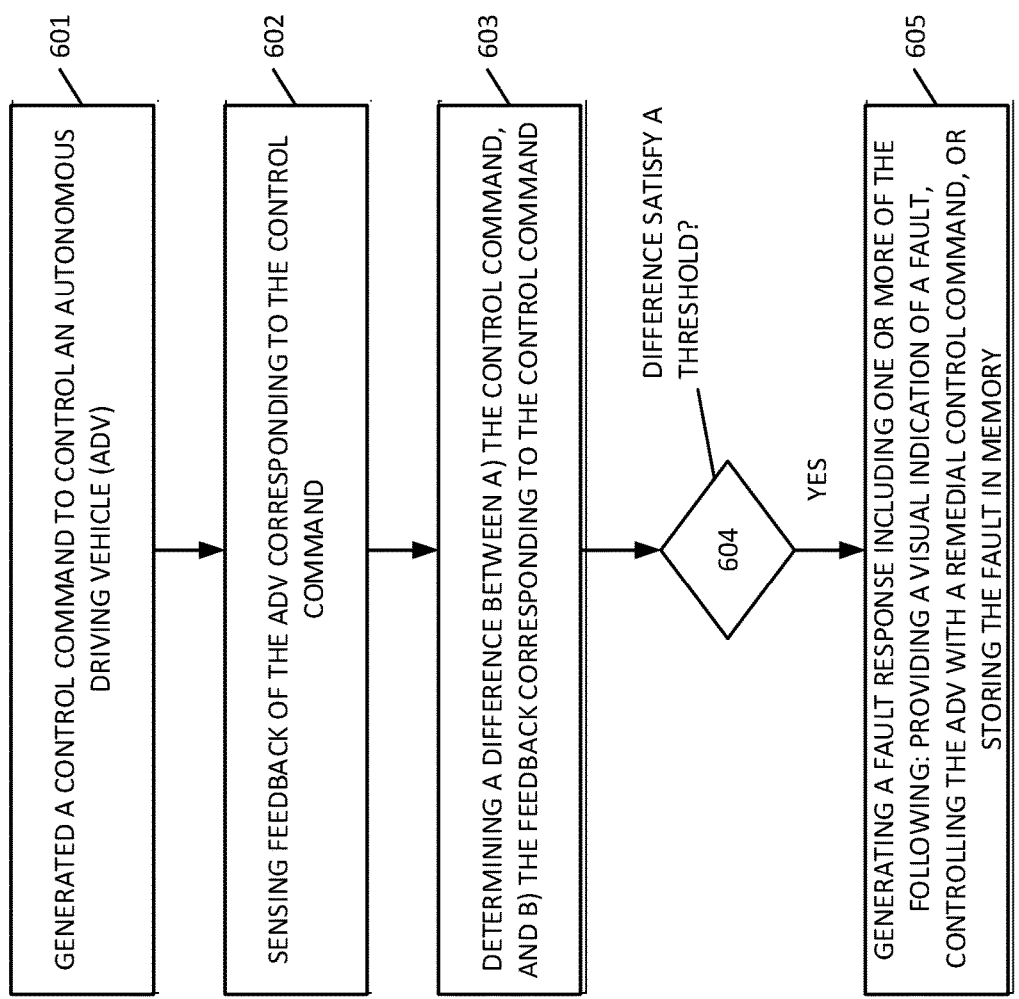
FIGS. 4 and 5 shows a system and process for monitoring control command, according to one embodiment.

In one aspect, a process 600 is described in FIG. 4 for monitoring an ADV system. Process 600 may be performed within control module 306. At block 601, the process includes generating a control command used to control the ADV. The control command can include, for example, a turn signal, a vehicle horn, an acceleration command, a throttle command, a steering command, or a brake command.

At block 602, the process includes sensing feedback or response of the ADV in response to the control command. The feedback can be sensed by one or more sensors of the ADV or combinations of the different sensors. As described, sensors can include, for example, a speed sensor, an IMU, a voltage or current sensor, a microphone, a light sensor, and/or any other sensor integral to sensor system 115 (see, for example, FIGS. 3A-3B and related sections).

At block 603, the process includes determining one or more differences between a) an expected response of the ADV (e.g., target response) in response to the control command, and b) the feedback corresponding to the control command (e.g., actual response of the ADV in response to the control command. For example, if the control command is a turn signal, then a photo sensor can sense whether the turn signal is emitting light. Similarly, a voltage, or current sensor can detect whether voltage or current is present at the light of the turn signal. The difference, in this case, can be that the control command dictates that the turn signal be 'on' but the sensed feedback shows that the turn signal is not 'on'.

Similarly, if the control command is an acceleration command, an IMU can sense acceleration, and/or a speed sensor can measure the change of speed (acceleration). The difference in this case, can be determined between the acceleration command, and the sensed acceleration. It should be understood that the ADV can determine what an expected acceleration of the ADV is based on a throttle command, for example, based on a look up table with real or simulated accelerations that correspond to throttles. The expected acceleration can also account for pitch angles of the ADV that can be sensed, for example, by an IMU. Thus, a control command can include a throttle command, rather than an acceleration command, to control how much the ADV accelerates or decelerates, similar to pedal position provided by a driver in non-autonomous driving.

In another example, if the control command is a horn, then a microphone, voltage and/or current sensor can measure whether the horn is actually honking. If, for example, the horn is much lower than expected, or not sensed at all, then the threshold can be satisfied. Thresholds can vary for different control commands and their corresponding sensed feedback.

At block 604, the process includes determining whether the difference satisfies a threshold, such as, within a predetermined range. For example, if the control command is commanding that the vehicle light be turned on (e.g., based on time of day) and sensed feedback shows that the light is not actually on, then the difference between the command and the feedback satisfies the threshold. The threshold in this case, is binary—0 for when the command matches the feedback, and 1 for when the command does not match the feedback. The threshold in this case can be 1. In another example, if the control command is a throttle command, the threshold can be a pre-determined margin of error. For example, if the threshold (representing an acceptable margin of error) is 2 m/s$^2$ and the throttle command is 25% (representing an expected acceleration of 4 m/s$^2$), but the sensed acceleration of the vehicle is only 1.5 m/s$^2$, then the difference (2.5 m/s$^2$) satisfies the threshold. If, however, the sensed acceleration is 3.9 m/s$^2$, then the difference (0.1 m/s$^2$) does not satisfy the threshold.

At block 605, the process includes generating a fault response including one or more of the following: providing a visual indication of a fault, controlling the ADV with a remedial control command, and/or storing the fault in memory. The fault response can be selected based on the type of control command.

For example, if the control command is a light, then an indication can be shown visually to a passenger of the ADV (e.g., through a user interface of the ADV) and/or a corresponding fault logged in memory of the ADV or remotely that indicates that a light fault is detected. If, however, an over or under acceleration is detected (e.g., the sensed acceleration is much greater or less than the expected acceleration), then a remedial control command may be generated that commands the ADV to slow down, pull over to the side, and/or stop. An indication can be shown to the passenger that an acceleration fault has been detected, and/or the fault can be logged in memory. The indication and fault can describe the nature of the fault (e.g., an acceleration fault) and/or the severity of the fault.

In this manner, the process, performed by an ADV, allows the ADV to detect possible problems with different systems based on inconsistencies or differences between what is commanded and what is sensed. A system diagram shown in FIG. 5 further describes such features.

Figure 5:
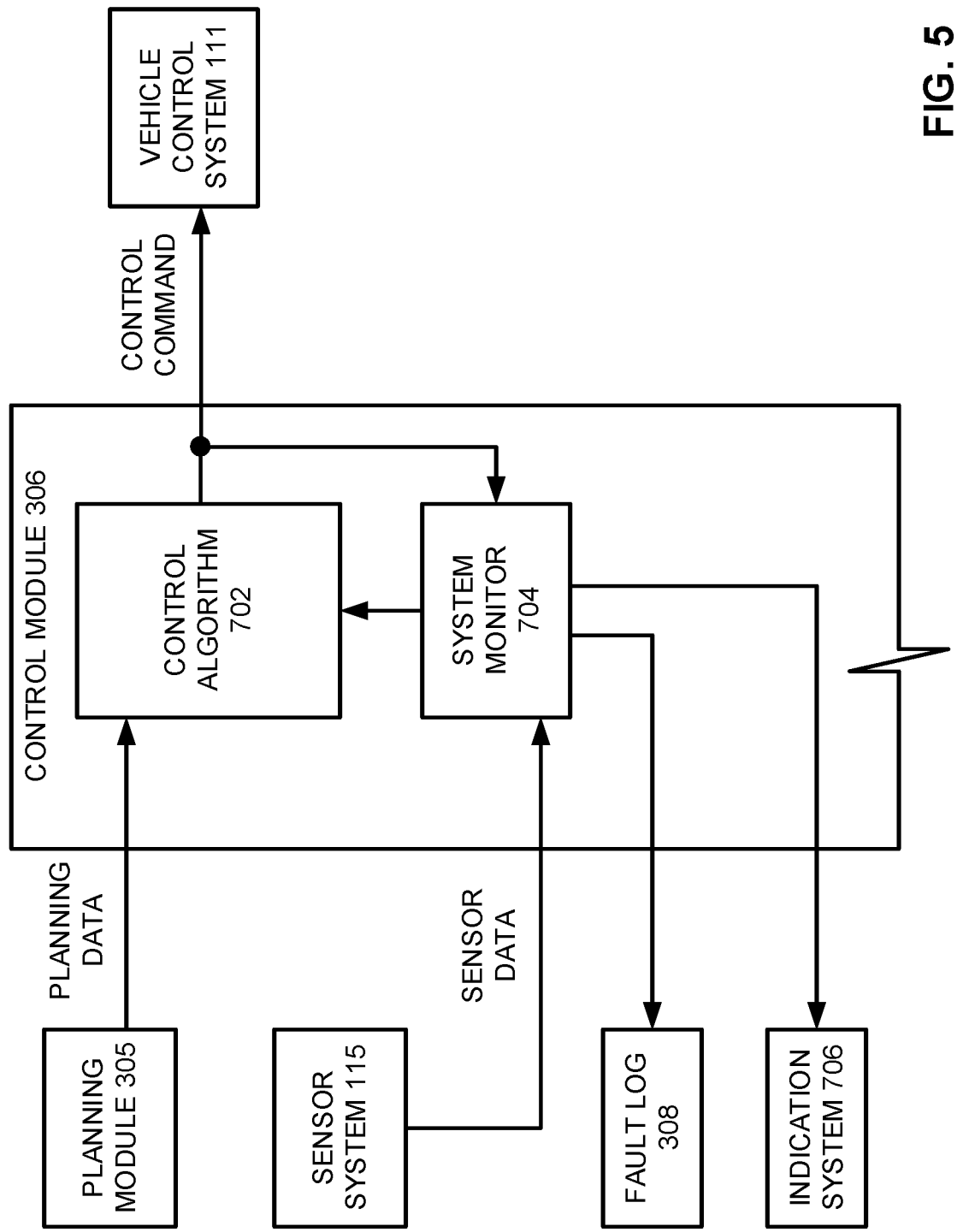

In FIG. 5, a control module 306 can have a control algorithm 702 that generates a control command to a vehicle control system 111. Control algorithm 702 may be stored in a machine-readable storage medium and executed by a controller such as a PID controller to perform a preconfigured task. As mentioned, the control command can include an acceleration command, a throttle command, a steering command, a brake command, a turn signal, a horn, etc. The control algorithm here can include various algorithms for different control commands, as described in other sections, the details of which not being germane to the present disclosure.

The control command can be determined based on planning data from planning module 305, and other inputs. System monitor 704 can compare the control command with the sensor data, sensed by sensor system 115 to determine one or more differences between the control command and corresponding sensor data. The sensor data corresponds to a type of control command, as described in the above examples (e.g., sensor feedback relating to the horn corresponds to a control command that commands the horn to honk).

If the difference exceeds a threshold, then system monitor can generate an appropriate fault response. For example, the system monitor can log a fault with fault log 308. Fault log 308 can be electronic memory of the ADV and/or remote memory (e.g., on a server) communicatively connected to the ADV. Additionally or alternatively, the system monitor can provide an indication of fault type and/or severity through indication system 706. The indication system can be a user interface on a dashboard of the ADV that provides passengers with visual vehicle diagnostic information. Additionally or alternatively, the system monitor can generate, within the control module, a remedial control command to address the detected system fault. For example, the control command can be a brake, a throttle command, or a series of control commands that cause the ADV to pull-over and stop.

Figure 6:
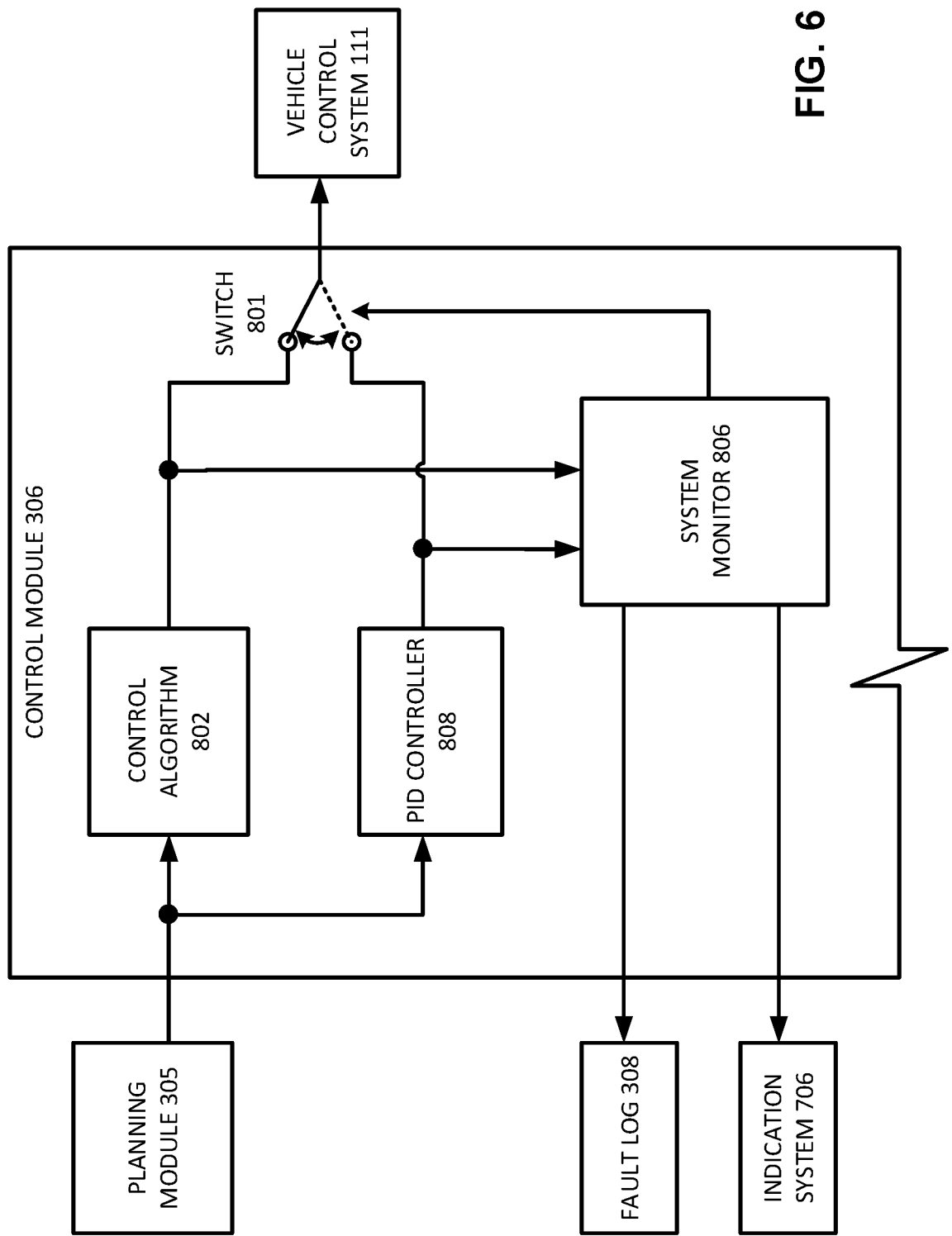
FIG. 6 shows a system and process for monitoring control command, based on a backup PID controller, according to one embodiment.

Referring to FIG. 6, a process and system is shown that can monitor the vehicle controls (e.g., the vehicle control module). A control module 306 generates a control command (e.g., an acceleration command, a throttle command, a steering command, or a brake command) based on planning and control data from planning module 305. Planning and control data can describe how the ADV should move in a next moving cycle (e.g., next route or path segment), as described in other sections. Based on the planning and control data, the control module 306 can generate proper commands to vehicle control system 111, according to the route or path defined by the planning and control data.

A system monitor 806 can determine a control difference between a) a control command generated based on a first control algorithm 802, and b) a second control command generated by a second control algorithm 808 that includes a proportional integral derivative (PID). The first control algorithm is different from the second control algorithm, in that it implements a control algorithm different from a simple PID. For example, the first control algorithm can implement model predictive control (MPC) to generate the control command. The PID controller, however, implements a simple PID control that is less prone to fault than more complicated controllers, such as, for example, MPC. In one aspect, the PID controller 808 implements only PID control, and no additional control loop, thus providing a reliable backup control loop that is error-resistant.

The system monitor 806 can compare the control command output by the first control algorithm with the control command output by the PID controller, to determine if the first control algorithm is faulty or generating a problematic control output that can result in erratic driving, damage to the vehicle, or a collision. Based on the comparison, if the control difference (the difference between the two outputs) satisfies a control threshold (representing an acceptable margin of error), then the system monitor can control the ADV with the second control command generated by the PID rather than the control command from the first control algorithm (as visually represented by switch 801). Additionally or alternatively, the system monitor can generate a fault response (e.g., log a fault in fault log 308 and/or generate an indication through indication system 706).

By recognizing that the PID controller 808 is less prone to fault than control algorithm 802, the system can detect possible control anomalies in the control command generated by control algorithm 802 and use a backup control command provided by the PID controller 808. If, however, the control algorithm 802 corrects itself after the control threshold was satisfied (e.g., the difference between the two control commands falls below the control threshold) then the system monitor can revert back to using the first control algorithm 802.

It should be understood that difference, as discussed throughout the disclosure, can be determined, for example, by subtraction or division (e.g., a ratio). The mentioned thresholds, representing acceptable margins of error, can be determined through test and repetition.

Although not shown, it should be understood that the control module 306 can have a control algorithm block 802 and corresponding PID controller 808 for different controls. For example, the control module can have a first pair of control algorithm block and PID controller that corresponds to a throttle command, a second pair of control algorithm block and PID controller that corresponds to a steering command, and/or a third pair of control blocks corresponding to the brakes.

Referring to FIG. 7, a system and process is shown for monitoring localization issues. The system can have system monitor 902 that processes planning data from planning module 305. If the ADV is not currently replanning a route of the ADV, a location difference is determined between a) an expected location of the ADV based on previously determined location of the ADV, and b) a current determined location of the ADV. Planning data can indicate (e.g., with a flag or data tag) whether the planning module is currently replanning. If the planning module is replanning, then the system monitor can cease monitoring because it can be expected that the expected location of the vehicle does not match the current determined location of the ADV, due to changes in the vehicle route. If the planning module is not replanning, however, then the expected location of the ADV should be within some margin of error (e.g., a location threshold) of the current determined location.

If the location difference satisfies a location threshold, then a fault response is generated. A location can be given as lateral and longitudinal coordinates, and the threshold can be lateral and/or longitudinal distances. As discussed, fault response can include a remedial control command, logging a fault to fault log 308, and/or making an indication through indication system 706.

The expected location of the ADV can be determined based on a previously determined location of the ADV and a trajectory, path, or route of the ADV. For example, based on a) a previously determined location of the ADV generated by localization module 301 at a previous driving cycle, b) the route or path segment data from the planning module, heading of the ADV, and/or c) speed of the ADV, an expected location of the ADV can be estimated. If this expected location is significantly different from the current determined location of the ADV (e.g., it satisfies a threshold), this can indicate a problem with localization. Accordingly, a fault response can be generated. The localization module 301 can determine location of the vehicle based on GPS, and/or techniques described in other sections.

Figure 8:
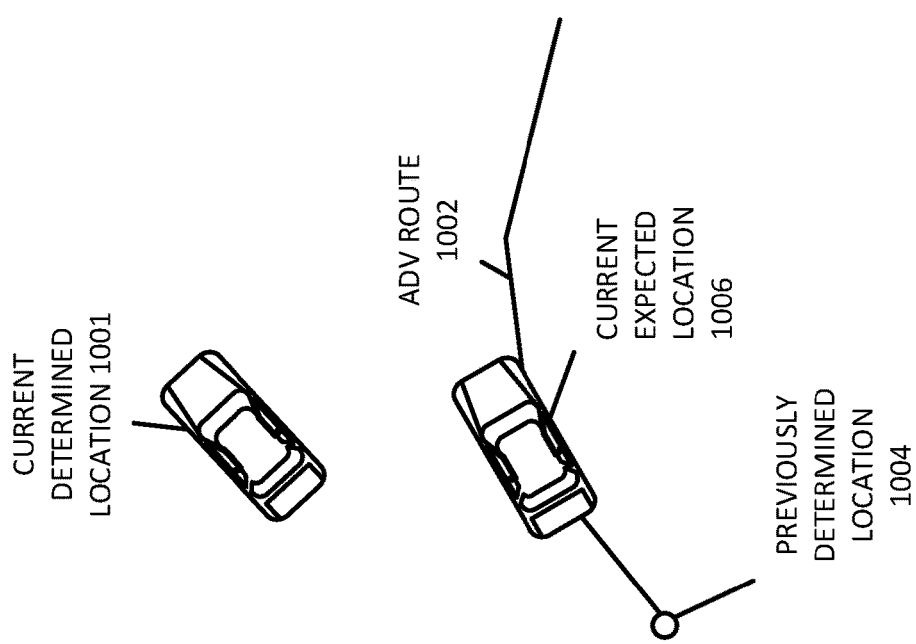
FIG. 8 illustrates localization of an ADV according to one embodiment.

To further illustrate, FIG. 8 shows a trajectory, route, or path 1002 can be determined for the ADV. The control module can generate control commands such as heading and speed to track along the trajectory, route or path. Based on a previously determined location of the ADV 1004, and the ADV's heading and speed, expected location 1006 can be estimated. If, however, the difference between a) the current location 1001 determined by the ADV's localization module, and b) the expected location 1006 is substantial (e.g., satisfying a location threshold), then localization results have significantly changed between cycles, thus indicating a potential problem with the localization module.

Figure 9:
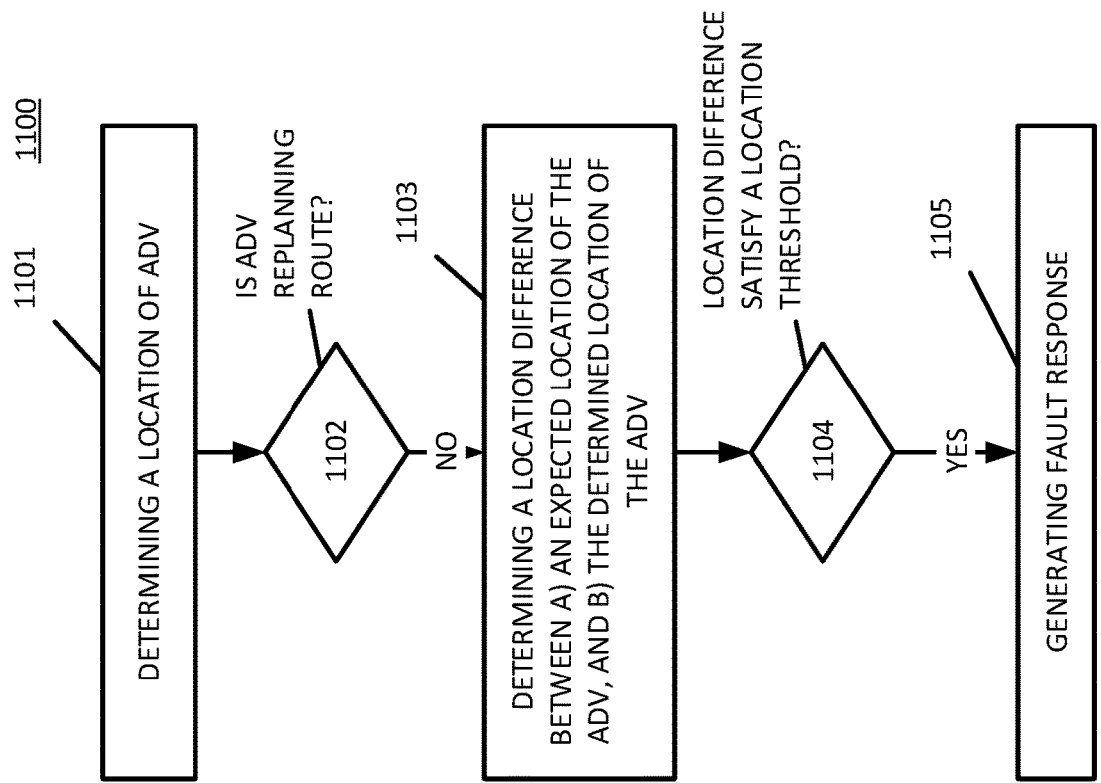
FIG. 9 shows a process for monitoring localization of an ADV, according to one embodiment.

A process 1100 is shown in FIG. 9 that can be performed by an ADV system to monitor whether localization is producing an accurate location of the ADV. At block 1101 the process includes determining a location of the ADV. As discussed, a localization module can utilize sensor data to localize the ADV. This can be a set of coordinates that define a physical location of the ADV.

At block 1102, the process includes determining whether the ADV is currently replanning a vehicle route. If not, then the system can continue to block 1103. If the ADV (e.g., the planning module of the ADV) is currently replanning, then the system does nothing and wait until the ADV is no longer replanning to continue to monitor localization.

At block 1103, the process includes determining a location difference between a) an expected location of the ADV, and b) the determined location of the ADV. At block 1104, if the location difference satisfies a location threshold then the process moves on to block 1105.

If the expected location and the determined location are within the threshold tolerance, then the process can do nothing. In this case, the process can assume that localization is working correctly. If, however, the location difference is sufficiently large that it satisfies the location threshold, then the process can proceed to block 1105, where it can generate a fault response. As discussed in other sections, the fault response can include logging a fault, providing an indication of a fault, and/or taking remedial control measure such as braking the vehicle and/or pulling the vehicle over.

It should be understood that the various features described can be combined to provide improved self-monitoring of different vehicle systems. For example, in one aspect, a control module can include the features described in FIGS. 5-7, in any combination.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method for monitoring an autonomous driving vehicle (ADV), the method comprising:
   receiving, at a control module, planning and control data from a planning module, the planning and control data representing a path generated by the planning module based on perception data perceiving driving environment surrounding the ADV; and
   in response to the planning and control data, performing by the control module,
      generating a control command to control the ADV to move according to the path,
      sensing feedback of the ADV in response to the control command,
      determining a difference between an expected response to the control command by the ADV and the feedback corresponding to the control command,
      if the difference satisfies a threshold, generating a fault response including,
         providing a visual indication of a fault, and
         controlling the ADV with a remedial control command; and
      if a control difference between a first control command generated by an MPC controller and a second control command generated by a proportional integral derivative (PID) controller satisfies a control threshold, then controlling the ADV with the second control command.

2. The method of claim 1, wherein the control command includes a turn signal or a horn.

3. The method of claim 1, wherein the feedback is sensed by one or more sensors of the ADV, including at least one of a speed sensor, an IMU, a voltage or current sensor, a microphone, or a light sensor.

4. The method of claim 1, wherein the remedial control command comprises a brake command.

5. The method of claim 1, wherein the control command includes an acceleration command, a throttle command, a steering command, or a brake command.

6. The method of claim 1, further comprising reverting to the MPC controller to generate driving commands for the ADV in response to the control difference no longer satisfying the control threshold.

7. The method of claim 6, wherein the PID controller does not include an additional control loop to generate the second control command.

8. The method of claim 1, further comprising:
   if the ADV is not currently replanning a route of the ADV by the planning module,
      determining a location difference between an expected location of the ADV and a determined location of the ADV; and
      if the location difference satisfies a location threshold, then generating the fault response.

9. The method of claim 8, wherein the expected location of the ADV is based on a previous location of the ADV and a trajectory of the ADV.

10. The method of claim 8, wherein the determined location of the ADV is based on global positioning system (GPS).

11. A non-transitory machine-readable medium having instructions stored therein, which when executed by a processor, cause the processor to perform operations, the operations comprising:
   receiving, at a control module, planning and control data from a planning module, the planning and control data representing a path generated by the planning module based on perception data perceiving driving environment surrounding the ADV; and
   in response to the planning and control data, performing by the control module,
      generating a control command to control the ADV to move according to the path,
      sensing feedback of the ADV in response to the control command,
      determining a difference between an expected response to the control command by the ADV and the feedback corresponding to the control command,
      if the difference satisfies a threshold, generating a fault response including,
         providing a visual indication of a fault, and
         controlling the ADV with a remedial control command; and
      if a control difference between a first control command generated by an MPC controller and a second control command generated by a proportional integral derivative (PID) controller satisfies a control threshold, then controlling the ADV with the second control command.

12. The non-transitory machine-readable medium of claim 11, wherein the control command includes an acceleration command, a throttle command, a steering command, or a brake command.

13. The non-transitory machine-readable medium of claim 11, further comprising reverting to the MPC controller to generate driving commands for the ADV in response to the control difference no longer satisfying the control threshold.

14. The non-transitory machine-readable medium of claim 13, wherein the PID controller does not include an additional control loop to generate the second control command.

15. The non-transitory machine-readable medium of claim 11, wherein the operations further include:
   if the ADV is not currently replanning a route of the ADV,
      determining a location difference between a) an expected location of the ADV, and b) a determined location of the ADV; and
      if the location difference satisfies a location threshold, then generating the fault response.

16. A data processing system, comprising:
   a processor; and
   a memory coupled to the processor to store instructions, which when executed by the processor, cause the processor to perform operations, the operations including
      receiving, at a control module, planning and control data from a planning module, the planning and control data representing a path generated by the planning module based on perception data perceiving driving environment surrounding the ADV; and
      in response to the planning and control data, performing by the control module,
         generating a control command to control the ADV to move according to the path,
         sensing feedback of the ADV in response to the control command,
         determining a difference between an expected response to the control command by the ADV and the feedback corresponding to the control command,
         if the difference satisfies a threshold, generating a fault response including,
            providing a visual indication of a fault, and
            controlling the ADV with a remedial control command; and
         if a control difference between a first control command generated by an MPC controller and a second control command generated by a proportional integral derivative (PID) controller satisfies a control threshold, then controlling the ADV with the second control command.

17. The data processing system of claim 16, wherein the control command includes an acceleration command, a throttle command, a steering command, or a brake command.

18. The data processing system of claim 16, further comprising reverting to the MPC controller to generate driving commands for the ADV in response to the control difference no longer satisfying the control threshold.

19. The data processing system of claim 18, wherein the PID controller does not include an additional control loop to generate the second control command.

20. The data processing system of claim 16, wherein the operations further comprise:
   if the ADV is not currently replanning a route of the ADV, then
      determining a location difference between a) an expected location of the ADV, and b) a determined location of the ADV; and
      if the location difference satisfies a location threshold, then generating the fault response.

* * * * *